Figure 3:
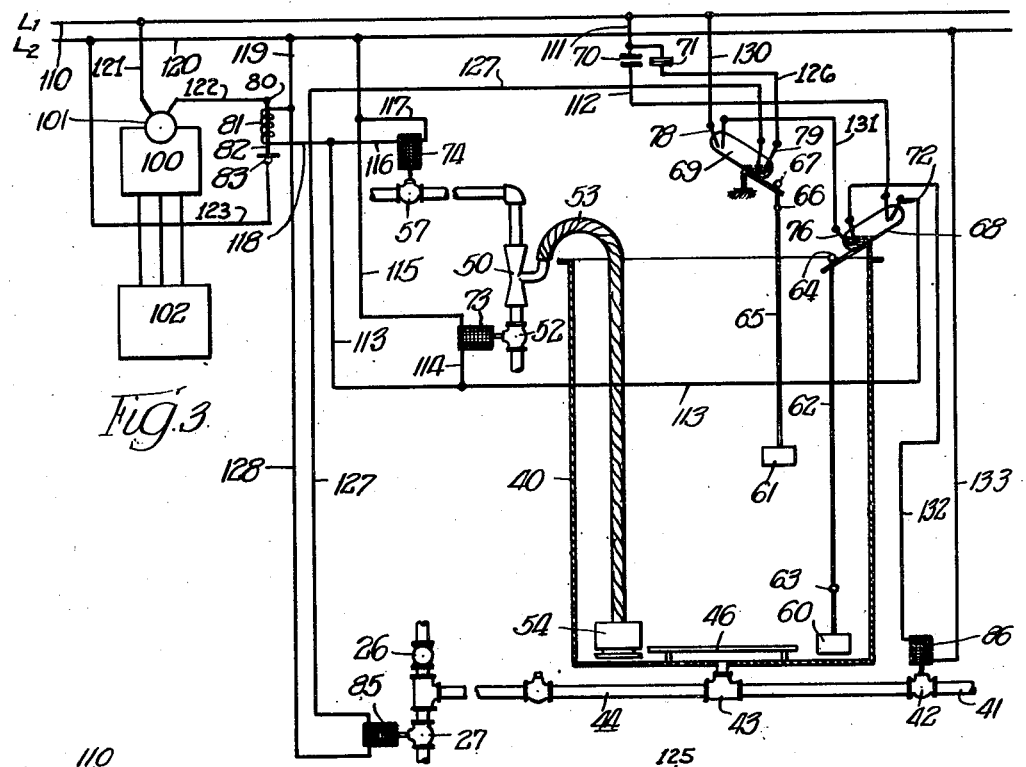

Jan. 16, 1951     W. J. HUGHES     2,538,418
APPARATUS FOR REGENERATION OF ION EXCHANGERS
Filed Nov. 21, 1946     2 Sheets-Sheet 1
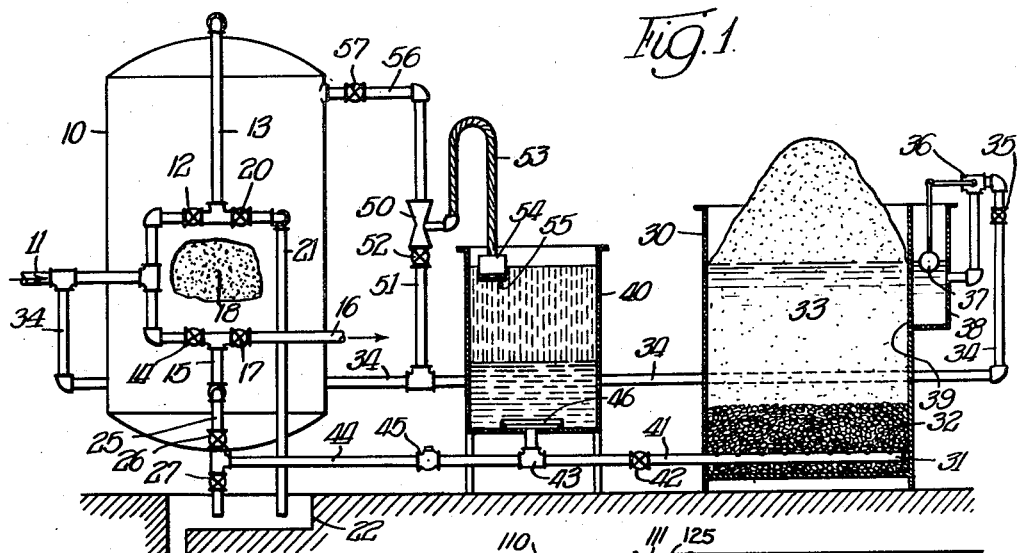
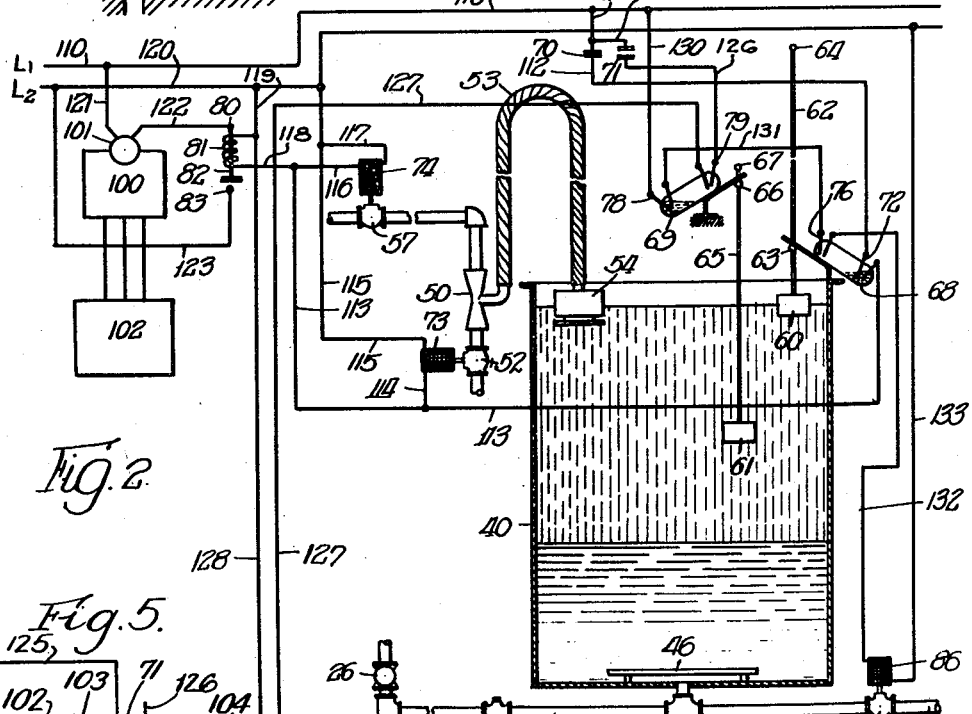
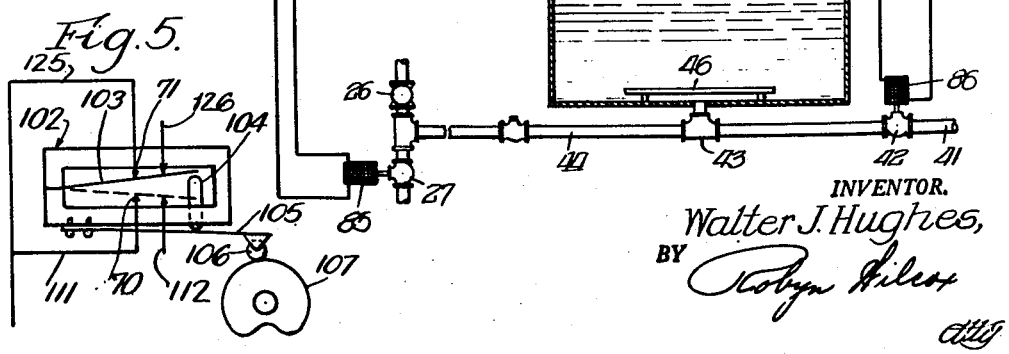
INVENTOR.
Walter J. Hughes,
BY INVENTOR.
Walter J. Hughes,
BY Patented Jan. 16, 1951

2,538,418

UNITED STATES PATENT OFFICE 2,538,418

APPARATUS FOR REGENERATION OF ION EXCHANGERS

Walter J. Hughes, Chicago, Ill., assignor to Infilco Incorporated, Chicago, Ill., a corporation of Delaware Application November 21, 1946, Serial No. 711,424

6 Claims. (Cl. 210—24)

This invention relates to the regeneration of ion exchangers and the like. More particularly it relates to regeneration with recovery of partly spent regenerant.

It is an object of this invention to provide means for carrying out recovery regeneration of ion exchangers which are more simple and cheaper in construction and operation than those heretofore used.

It is another object of the invention to provide automatically operated means for recovery regeneration.

Another object is an automatic zeolite softening system including automatically controlled means for brining and recovery of brine.

Another and principal object of the invention is a single measuring tank for regenerant recovery, wherein measured quantities of partly used regenerant and of fresh regenerant are received and stored, to be withdrawn separately and sequentially for use in a subsequent regeneration cycle.

Another object is to provide a single brine tank, means operative for introducing thereinto without intermingling, both partly used brine and fresh saturated brine for storage therein and means operative for withdrawing first the partly used brine and thereafter the fresh brine for use in a new regeneration cycle.

Another object is to provide means for automatically operating the means for brining, rinsing to recovery and refilling of the brine tank.

Other objects of the invention will become apparent upon consideration of the description and claims which follow.

In the regeneration of ion exchangers it has been found that there is a considerable difference between the quantity of regenerant actually used in regeneration to a given exchange capacity and the theoretical quantity of regenerant needed to satisfy the exchange equation. Thus in the regeneration of a zeolite softener, for instance, by a brine containing common salt (NaCl), about 1/6 pound NaCl theoretically satisfies the exchange for 1000 grains as CaCO3 exchange capacity, while the quantity actually used is generally about 1/2 pound.

In the regeneration of zeolite water softeners by a brine containing common salt it has been suggested recovering brine used in one regeneration cycle and reusing it in a subsequent regeneration, supplemented by a reduced quantity of fresh brine. This recovery method of regeneration permits substantial savings in salt used for regeneration. Instead of about the half pound of salt per 1000 grains of CaCO3 exchange capacity commonly used in ordinary regeneration without recovery of brine, only about three tenths pound is needed when partly spent brine is recovered and reused. The saving thus amounts to about 40%. Obviously similar savings could be had in the regeneration of other exchangers, as for example the regeneration of carbonaceous zeolites by sulfuric acid, or the regeneration with caustic of fluorine removal bodies, such as those disclosed in Patent No. 2,227,432. Therefore, while my invention will be described for purposes of exemplification and illustration as applied to a zeolite softening system using brine as a regenerant, for which it is especially well fitted, it is not limited to this application. The invention is useful in any system of regeneration where a marked difference between the theoretically needed and the actually used quantity of regenerant exists and in which there is a suitable difference in the specific gravity of the fresh and the "re-used" regenerant.

In carrying out "recovery regeneration" of zeolite softeners it has been usual to employ two brine tanks, one for the partly used and recovered brine and one for the freshly saturated brine. The use of two brine tanks involves also duplication of piping and valves and requires additional space and is therefore necessarily relatively expensive. Furthermore the operation of such a system is complicated and is not easily adapted to automatic control.

I therefore now propose to use a single tank for the fresh and the partly used brine, and to provide means whereby measured quantities of the two kinds of brine are introduced into the single tank and remain separate therein and can be withdrawn to a softener in the desired sequence.

I also provide means whereby the reused brine is wasted and only the brine used for the first time is recovered for a second use. My system can be operated manually, but it lends itself readily to automatic operation and suitable means for such automatic operation form a part of this invention.

In carrying out my invention I take advantage of the difference in weight between a saturated fresh and a diluted reused brine solution. Fresh saturated brine contains about 26% by weight of salt. On its way to use in the regeneration of the softener the fresh brine (in my apparatus and process) is diluted to about 13%. This 13% brine is recovered and introduced into the bottom of my brine tank. When at the end of the recovery rinse saturated brine is admitted into the bottom of the brine tank the heavier 26% fresh brine from the saturator displaces the lighter recovered brine upwardly without any substantial intermingling of the two. The inlet means provided for my brine tank minimizes any intermingling and promotes stratification. Similarly I provide suitable take-off means which separately withdraws first the dilute brine and thereafter the fresh brine. I also provide means whereby the sequential operations of brine delivery to the softener, rinsing to waste, rinsing to recovery and refilling the brine tank with measured quantities of partly used and of fresh brine may be controlled automatically.

Figure 4:
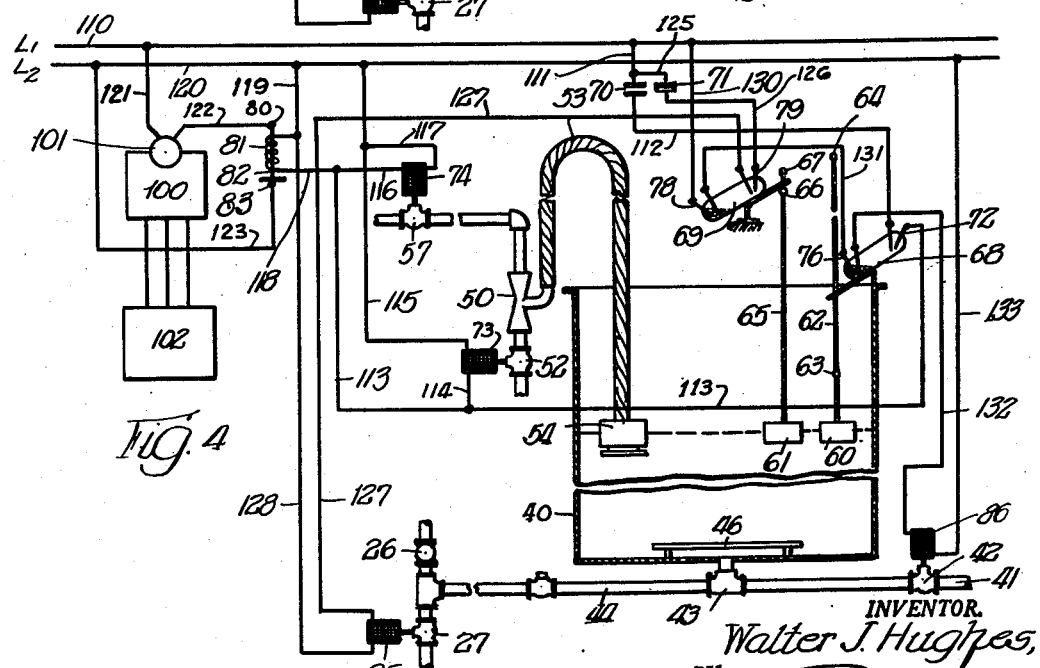

The invention will be more clearly understood by reference to the detailed description and to the drawings which form a part hereof and wherein:

Figure 1 shows diagrammatically a zeolite softening plant utilizing my invention;

Figures 2, 3 and 4 show diagrammatically means for automatically controlling the operations of brining, rinsing to recovery and refilling of the brine tank, Figure 2 showing the position of the various contacts as it exists immediately after termination of backwashing and at the start of brine delivery; Figure 3 the position after completion of brine delivery and at the start of brine recovery; and Figure 4 the position at the completion of the recovery operation; and Figure 5 is a detail view diagrammatically illustrating the contacts in the position switch, for controlling certain operations of the apparatus of my invention.

A softening plant utilizing my invention may include a softener 10, a brine measuring tank 40 and a saturator 30, interconnected by suitable conduits as described below. I prefer that the softener 10 be of conventional design, as shown, and contain a bed of zeolites 18. Preferably the softener tank contains a suitable underdrain system, not shown, as is well known in the art. Water to be softened is admitted under suitable operating pressure through an inlet pipe 11, connected through an inlet valve 12 and a branch pipe 13 to the top of the tank 10 for downflow of the water through the bed of zeolites 18 during the softening run. Pipe 11 is also connected to the underdrain at the bottom of the tank 10, as through a wash water valve 14 and a branch pipe 15 for admission of wash water for upflow through the bed 18 during backwashing. Softened water is withdrawn through a soft water conduit 16 provided with an outlet valve 17 which is also connected to pipe 15 which leads to the underdrain system. Washwater is withdrawn from above the bed 18 through pipe 13, a waste valve 20 and a waste conduit 21 discharging into a drain 22. A rinse conduit 25 leads from the underdrain to the drain 22 and is provided with a rinse valve 26 and a recovery valve 27, the latter being normally open.

The saturator 30 is of conventional design and is shown as an open tank fitted with an underdrain draw off pipe 31. A layer of gravel 32 will usually be arranged over the pipe 31 to support the salt 33 with which the tank is filled. Water is supplied to the saturator 30 through a supply conduit 34 which branches from inlet conduit 11. A normally open, emergency shut off valve 35 may be provided on supply conduit 34 to permit shutting off the supply of water to the saturator independently of the liquid level therein. Normally, however, the supply to saturator 30 through conduit 34 is controlled by a valve 36 operated by a float 37 in a float compartment 38 communicating with the interior of saturator 30 through an opening 39. The float 37 is set to close the valve 36 when the liquid level has reached a predetermined elevation, such as that shown in Figure 1. The salt 33 dissolves in the liquid and forms a saturated brine of a density of 26% by weight, which fills the voids in the gravel 32 and is always available for draw off through underdrain draw off pipe 31.

Pipe 31 is connected to a brine transfer conduit 41, provided with a valve 42, and thence to the brine measuring tank 40 through a suitable connection, such as T 43 leading into the bottom thereof. Also joined to the T connection 43 is a recovery conduit 44 which branches from the rinse conduit 25 at a point between the rinse valve 26 and the recovery valve 27. Preferably the recovery conduit 44 is provided with a check valve 45, however, in certain cases to be described below, the valve 45 may be a solenoid operated valve. The discharge end of the connection 43 is covered by a diffusor plate 46, as shown. Brine measuring tank 40 may be an open tank, as shown.

A jet pump or ejector 50 is located adjacent the brine tank 40 and receives water from supply conduit 34 through a branch conduit 51. Flow through the branch conduit 34 is controlled by means of a suitable ejector valve 52. The suction port of the ejector 50 communicates with the brine tank 40, preferably through a flexible connection, such as a hose 53. The decanting end of suction hose 53 may be carried by a float 54 provided with a spaced cover plate 55 at the bottom serving as a horizontal take off which prevents vertical currents to the suction opening. By this means I am enabled to withdraw the brines of different specific gravity separately and without any mixing by vertical currents. The discharge end of the jet pump 50 is connected to the softener 10 by a conduit 56 provided with a suitable brine inlet valve 57.

Figure 1 shows the brine tank 40 ready for use, filled to a given level with measured quantities of partly used brine, indicated by the vertical broken lines, superposed upon and stratified across saturated fresh brine, indicated by the horizontal broken lines. The charge of partly used, or 13%, brine is about twice the volume of the saturated, or 26%, brine. The size of tank 40 will be figured on the basis of three tenth pound salt equivalent for each 1000 grains of CaCO₃ exchange capacity of the softener. Since saturated brine at atmospheric pressure contains about 2.6 pounds of salt per gallon, the volume of fresh saturated brine required for regeneration of any particular softener can be readily determined. The brine tank 40 should have a holding capacity of 3 times the volume of saturated brine required, since there will be about two volumes of partly used brine recovered.

The operation of the zeolite softener 10 during softening and backwashing is conventional and need not be described in detail. During softening all valves will be closed with the exception of inlet valve 12, outlet valve 17 and the normally open valves 27 and 35, the position of valve 36 depending on the liquid level in saturator tank 30. Water to be softened will be admitted through pipe 11 and branch pipe 13 to the top of the tank 10 and flow downwardly through the zeolite bed 18 to be withdrawn to a point of use or further treatment through soft water conduit 16. When the exchange capacity of the bed 18 is exhausted inlet valve 12 and outlet valve 17 are closed and wash water valve 14 and waste valve 20 are opened and the wash water is admitted through pipe 11 and branch pipe 15 to the bottom of the tank 10 hence it flows upwardly through the bed, to be withdrawn from above the bed through waste conduit 21 into drain 22, all as usual in the art.

When backwashing is finished, wash water valve 14 and waste valve 20 are closed and ejector valve 52, brine inlet valve 57 and rinse valve 26 are opened; brine transfer valve 42 being closed at this stage. Brine is then ejected by ejector 50 from brine tank 40 through the floating decanting take off 55 and flexible connection 53 and is delivered through conduit 56 into the top of the softener 10 whence it is forced downwardly through the bed 18 through a suitable distribution means, not shown. The floating take off delivers first the 13% brine from the upper portion of the brine tank, and thereafter the 26% brine, until all brine (both the recovered and the fresh) has been ejected from brine measure tank 40. The ejector is of such construction that the jet water and brine are mixed in the ratio of about 1 to 1. Thus the partly used brine is diluted from 13% to about 6½%, while the saturated brine is diluted from 26% to about 13%. The free board space of the softener 10 and the voids between particles of the zeolite are sufficient to hold practically all of this volume. The water within these spaces, introduced previously to brining, is displaced downwardly and out through the open valves 26 and 27 to waste. When all brine has been ejected ejector valve 52 and brine inlet valve 57 are closed and the inlet valve 12 is opened to admit rinse water to the top of the bed to displace the brine and rinse the bed. The first brine being displaced is the 6½% brine which has been used for the second time. This is allowed to go to waste through the open valves 26 and 27. But as soon as this 6½% brine has been expelled and the new 13% brine begins to emerge the recovery valve 27 is closed, thus diverting this brine through recovery conduit 44, check valve 45 and connection 43 into the brine tank 40. When the two volumes of 13% brine have been recovered, recovery valve 27 is reopened. Inlet valve 12 having been opened after the termination of the brine delivery operation to admit rinse water to the top of the softener 10 to displace the brine and rinse the bed downwardly, the reopening of valve 27 permits completion of the rinse through conduit 25 and the open valves 26 and 27 to drain 22. When this rinsing operation is finished the rinse valve 26 is closed, the outlet valve 17 opened and the softening cycle starts again.

After recovery of the two volumes of 13% brine is completed valve 42 is opened and one volume of fresh or saturated, 26%, brine runs into the brine tank 40 from saturator tank 30 through draw off pipe 31, brine conduit 41 and connection 43, the one volume being measured by restoration of the levels in measuring tank 40 and saturator tank 30 as controlled by the float 37. The diffusor plate 46 distributes the incoming heavy brine horizontally across the tank so that it stratifies below the lighter partly used brine which is displaced upwardly without intermingling with the saturated brine. When the proper measure of saturated brine has been transferred to brine measuring tank 40 the valve 42 is closed and the brine tank is now ready for reuse when a new regeneration of the softener is needed.

The operations of brine delivery to the softener 10, of recovery rinsing and of admitting of saturated brine to the brine measuring tank 40 may be carried out manually by setting the valves in the sequence and manner described above. However, they also may, and usually will be carried out automatically in cyclic sequence and as functions of an automatic time cycle used in the operation of the softener. Figures 2, 3 and 4 show diagrammatically suitable means for carrying out such automatic operations.

The softening and backwashing may be automatically controlled in a usual manner by a position switch 102 which may be of a well known construction such as a micro switch operated by a rotatable cam 107, from a timer 100 driven by a timer motor 101. The position switch 102 controls operation of the inlet and outlet valves, the wash water and waste valves and the rinse valve of the softener in proper sequence and in any suitable manner, such as for instance by hydraulic means. Such means and operation are well known in the art and are not shown and described herein as they form no part of this invention. The means for automatically operating the brine delivery to the softener 10, recovery rinse and admission of saturated brine to the brine measuring tank 40 are fitted into the conventional cycle of such operations. These means may include two floats, 60 and 61, which are operated by changes in the liquid level in brine tank 40. Rod 62 of float 60 carries collars 63 and 64, and rod 65 of float 61 carries collars 66 and 67. Two double-throw double-pole switches, 68 and 69, are in a separate circuit across the power circuit $L_1$—$L_2$ to the timer 100 and are positioned so as to be operated by the collars 63 and 64, and 66 and 67, respectively. The relative position of the collars 63 and 64 on rod 62 and of switch 68 is such that float 60 rides on the liquid surface when the tank is full, and is permitted to descend to adjacent the bottom of the tank when all brine has been ejected, the lower collar 63 tipping switch 68 when the float is in its uppermost position and the upper collar 64 reversing the switch when the float is in its lowermost position. The relative position of the collars 66 and 67 on rod 65 of float 61 and of switch 69 is such that the upward travel of float 61 is limited to the elevation where the brine tank is two-thirds full (when brine recovery is terminated), in which position the lower collar 66 tips switch 69. The downward extent of the travel of float 61 is not sharply critical and the two collars 66 and 67 can be quite close together, as shown.

I also provide two additional sets of contacts, 70 and 71, which are positioned by the cam 107 of the position switch 102 which also controls operation of the valves of the softener. For clarity and simplification the contacts 70 and 71 are shown in Figures 2 to 4 of the drawings as separate from the position switch; it will be understood, however, that they form actually a part of the switch, as clearly shown in the diagrammatic illustration of the position switch 102 shown in Figure 5. In this figure the contacts 70 and 71 of the switch are shown as being alternately closed by a contact arm 103, operated by a plunger 104. The plunger 104 is slidably mounted in the frame for the switch and engages the contact arm 103 at one of its ends and a follower arm 105 at its opposite end. The contact arm 103 may be secured to the frame of the switch at one of its ends and may be made of an elastic material such as phosphor bronze or spring steel, so as to follow the plunger upon its return path. The follower arm 105 may be secured to the outside of the frame of the switch at one of its ends and may have a cam follower, such as a roller 106 at its opposite end. The follower arm 105 may also be made of an elastic material such as spring steel, to hold the roller to the face of the rotatable cam 107. The timer 100 is set to actuate position switch 102 to close contact 70 immediately after termination of backwashing. At this time, as shown in Figure 2, the float 60 is at its highest point of travel and collar 63 has tipped the switch 68 to the position to close contacts 72 and open contacts 76. Closing of contact 70 establishes, therefore, a circuit from source of power $L_1$ through conductors 110 and 111, contact 70, conductor 112, contacts 72 of float switch 68, conductors 113 and 114 to solenoid 73 of ejector valve 52 and thence through conductor 115 and conductor 120 to source of power $L_2$. Closing of this circuit energizes also solenoid 74 of brine inlet valve 57 which is connected to this circuit through conductors 116 and 117. This opens valves 52 and 57. Rinse valve 26 is controlled by the timer 100 in usual manner to be opened hydraulically by position switch 102 immediately after the backwashing operation is concluded, which coincides with the closing of contact 70 by position switch 102. Valves 52, 57 and 26 now being open, brine delivery starts and brine is ejected from brine tank 40 and delivered to the top of softener 10 and is forced through the zeolite bed to be discharged to drain 22.

I also provide a relay 80 whose coil 81 is connected in the circuit through contact 70 and contact 72 of switch 68, above described. Closing of contact 70 by position switch 102 establishes therefore also a circuit from $L_1$ through conductors 110 and 111, contact 70, conductor 112, contacts 72, conductors 113, and 118, coil 81 of the normally closed relay 80, and conductors 119 and 120 to $L_2$. Prior to the closing of contact 70, the pole 82 of relay 80 is in closed position and a circuit is closed from $L_1$ through conductors 110 and 121, timer motor 101, conductor 122, pole 82 of relay 80, binding post 83 of relay 80 and conductor 123 to $L_2$. However, when contact 70 is closed and the coil 81 of relay 80 is energized, as above described, the pole 82 of relay 80 opens. This breaks the circuit to the timer motor 101 and the timer 100 is thereby stopped. The timer remains stopped as long as coil 81 is energized, or, in other words, as long as the circuit through contacts 70 and 72 is closed, which is coextensive with the period of travel of float 60 from its highest position to its lowermost position, i. e. with the period of brine delivery from brine tank 40 to softener 10. When at the end of the brine delivery the float 60 reaches its lowermost position in brine tank 40, collar 64 on float rod 62 tips switch 68 from the position shown in Figure 2 to that shown in Figure 3, whereby contacts 72 of switch 68 are opened and contacts 76 are closed. This breaks the circuit to solenoid 73 of ejector valve 52 and solenoid 74 of brine inlet valve 57 at 72 so that these solenoids are de-energized and the valves 52 and 57 closed. Breaking of the circuit at contact 72 also de-energizes coil 81 of relay 80 to close the pole 82 whereby the circuit to the timer motor is again closed and the timer 100 is restarted. The timer will thus be idle during the volumetric operation of brine ejection and delivery and restart operation when brine delivery has been completed and valves 52 and 57 have been closed.

Before float 60 reaches the position wherein collar 64 tips float switch 68 the float 61 will have reached the position wherein collar 67 tips switch 69 from the position shown in Figure 2 (where contacts 78 are closed and contacts 79 open) to the position shown in Figure 3, where contacts 79 are closed and contacts 78 are open.

When the timer 100 is restarted, it starts the rinse operation in the usual manner by controlling position switch 102 to hydraulically open inlet valve 12, whereby rinse water is admitted to the top of the tank 10, to displace and wash out the brine in the bed. The timer also is set to control position switch 102 to close contact 71 and open contact 70 at the time when the heavy 13% brine begins to be displaced and appear at the recovery valve 27. Closing of contact 71 completes a circuit from source of power $L_1$ through conductors 110, 111 and 125, contact 71, conductor 126, contacts 79 of switch 69, conductor 127 to solenoid 85 of recovery valve 27 and thence through conductors 128, 119 and 120 back to source of power $L_2$ to close recovery valve 27. With valve 27 closed the 13% brine flows through recovery conduit 44, check valve 45 and connection 43 into the brine measuring tank 40, where it is spread evenly over the cross sectional area of the tank by the diffusor plate 46. Recovery valve 27 continues in its closed position until the two volumes of 13% brine have been recovered, at which time the float 61 has reached its upper position as determined by setting of collar 66 and switch 69 is tipped by the collar 66 to the position shown in Figure 4. In this position of the switch 69 contacts 79 are opened and contacts 78 closed. This breaks the circuit through the solenoid 85 of recovery valve 27 at contacts 79 whereupon valve 27 opens permitting the rinse water which follows the brine through the bed, to be discharged to the drain 22.

Float switch 68 at this intermediate position of the float 60 is not yet tipped by collar 63 on rod 62 so that contact 76 remains closed and contact 72 is still open. In this position of the contacts, shown in Figure 4, a circuit is established from source of power $L_1$ through conductors 110 and 130, contact 78 of switch 69, conductor 131, contact 76 of switch 68, conductor 132 to solenoid 86 of valve 42 and thence through conductors 133 and 120 back to source of power $L_2$, to open valve 42 and admit saturated fresh brine from saturator 30 to brine measure tank 40.

As soon as brine tank 40 is filled to the predetermined level, as established by setting of button 63 on rod 62, the collar 63 tips switch 68 from the position shown in Figures 3 and 4 to that of Figure 2, where contacts 76 are open and contacts 72 are closed, thereby breaking the circuit to solenoid 86 of valve 42 at contacts 76. This closes valve 42 and stops flow of brine from the saturator to the brine tank 40. The brine tank 40 is now filled and ready for use, and all circuits broken until such time when the timer again closes contact 70 at the beginning of a new brining operation.

It will be seen that I provide simple and efficient means for automatically controlling recovery regeneration with my single brine tank and for fitting the automatic operation of brining and brine recovery into the conventional cycle of automatically controlled operations of a zeolite softener. However, I do not wish to limit myself to the exact embodiments shown and described above for exemplification and illustration, as obviously these may be varied in many respects without departing from the spirit and scope of the invention. Thus, while it is preferable to stop the timer 100 during brining by the relay 80, as described, it should be understood that this is not essential. The timer could be allowed to run during brining, provided the cams of the position switch were shaped suitably, and this would permit elimination of the relay 80. Similarly, instead of controlling the rinse and recovery operations by using the three valves as shown and described, the same effect could obviously be had by using the valve 27 as rinse valve and the valve 45 as the solenoid operated recovery valve. This would permit eliminating valve 26. While it is preferred to have the rinse valve in its usual position to avoid any change in the conventional layout of the softener, such a change in location of the valves is contemplated as one of the forms in which the invention can be embodied. Other changes will be apparent to those skilled in the art.

It will also be understood that the regenerant tank and the automatic means for operating regenerant delivery and recovery can easily be adapted to use in regeneration of ion exchangers other than zeolite.

I claim:

1. In a brine recovery regeneration system for a zeolite softener the combination with said softener of a single brine measuring tank, an inlet into the bottom of said tank, conduit means leading from the bottom of said softener to said tank inlet, a drain connection leading from said conduit means to waste, a valve on said conduit means upstream of said drain connection, a check valve at a point on said conduit means between said drain connection and said tank inlet, a normally open valve on said drain connection, second conduit means connecting said inlet to a source of saturated brine, a valve on said second conduit means, an ejector, a connection from a source of liquid under pressure to said ejector, a valve on said connection to said ejector, a flexible suction means connected to said ejector, a float supporting the inlet end of said suction means and adapted to float on liquid in said tank, a connection from the ejector discharge to the top of said softener, and a valve on said last mentioned connection.

2. The apparatus of claim 1 including also means operable to stratify liquid in said tank and prevent upward currents, said means including a diffusor plate above said bottom inlet and a cover plate below the inlet of said suction means.

3. The combination with a zeolite softener including a softening tank, valved inlet means for water to be softened, valved outlet means for softened water, valved wash water inlet and outlet means, and a rinse conduit leading from the bottom of said tank and having a rinse valve, and a saturator having a water inlet and a brine outlet, of a brine tank, an inlet into the bottom of said brine tank, a brine recovery conduit leading from a point on said rinse conduit downstream of said rinse valve to said brine tank inlet, a check valve on said recovery conduit, a normally open valve on said rinse conduit downstream of said recovery conduit, a saturated brine conduit leading from said saturator outlet to said brine tank inlet, an ejector, a connection to said ejector from a source of liquid under pressure, a valve on said connection, flexible suction means connected to said ejector, a float supporting the inlet end of said suction means and adapted to float on liquid in said brine tank, a conduit leading from the discharge end of said ejector to the upper portion of said softener, and a valve on said conduit.

4. A recovery regeneration system for an ion exchange apparatus comprising a regenerant tank, inlet means for partly used regenerant discharging into the bottom of said tank, valve means controlling flow through said inlet means, inlet means for fresh regenerant discharging into the bottom of said tank, second valve means controlling flow through said fresh regenerant inlet means, a float in said tank, an ejector, a flexible conduit having an inlet supported by said float and an outlet joined to the suction inlet of said ejector, a pressure water inlet to said ejector, third valve means associated with said ejector inlet, outlet means from said ejector, a fourth valve controlling flow through said outlet means, solenoids associated with said valves for opening and closing the same, a first circuit through the solenoids of said third and fourth valve, a power driven timer, contact means operated by said timer to close said first circuit to open said third and fourth valve, float controlled means operative to open said first circuit and thereby close said third and fourth valve, a second circuit through the solenoid of said first valve, a third circuit through the solenoid of said second valve, second contact means controlled by said timer to close said second circuit upon opening of the first circuit to open said first valve, float controlled means effective to open said second circuit and close said first valve, and to simultaneously close said third circuit to open said fourth valve, and float controlled means effective to open said third circuit and close said fourth valve.

5. The apparatus of claim 4 including also relay means adapted to stop said timer upon closing of said first circuit and to restart said timer upon breaking of said first circuit.

6. A recovery regeneration system for an ion exchange apparatus having an inlet for regenerant and an outlet for regenerant, comprising a regenerant tank, inlet means for partly used regenerant discharging into the bottom of said tank and adapted to be connected to said regenerant outlet, valve means controlling flow through said inlet means, second inlet means for fresh regenerant discharging into the bottom of the tank and adapted to be connected to a source of fresh regenerant, second valve means controlling flow through said second inlet means, an ejector, flexible suction means connected to said ejector, a float in said tank supporting the inlet end of said suction means, an inlet to said ejector adapted to be connected to a source of liquid under pressure, a valve controlling flow through said ejector inlet, an outlet from said ejector adapted to be connected to the regenerant inlet of said ion exchanger, and a valve controlling flow through said ejector outlet.

WALTER J. HUGHES.

REFERENCES CITED

The following references are of record in the file of this patent:

UNITED STATES PATENTS

| Number | Name | Date |
|---|---|---|
| 2,065,962 | Bowers | Dec. 29, 1936 |
| 2,240,171 | Brice et al. | Apr. 29, 1941 |
| 2,323,341 | McGill | July 6, 1943 |
| 2,407,538 | Daniels | Sept. 10, 1946 |
| 2,407,539 | Daniels | Sept. 10, 1946 |
| 2,415,936 | Contant et al. | Feb. 18, 1947 |
| 2,422,054 | Tiger | June 10, 1947 |